US005653417A

United States Patent [19]
DeBarber et al.

[11] Patent Number: 5,653,417
[45] Date of Patent: Aug. 5, 1997

[54] SCALE LOCKING FOOT

[75] Inventors: Christopher DeBarber, Woodbury; Gerald C. Freeman, Norwalk; Edward R. Soldi, Jr., Stratford, all of Conn.

[73] Assignee: Pitney Bowes Inc., Stamford, Conn.

[21] Appl. No.: 276,729

[22] Filed: Jul. 18, 1994

[51] Int. Cl.⁶ .................................................. F16M 5/00
[52] U.S. Cl. ........................ 248/688; 177/239; 248/188.4; 248/677
[58] Field of Search .................... 248/688, 677, 248/650, 188.4, 188.5, 188.8, 188.9; 177/239, 264, DIG. 9

[56] References Cited

U.S. PATENT DOCUMENTS

| | | | |
|---|---|---|---|
| 269,365 | 12/1882 | Wood | 248/188.4 |
| 1,583,252 | 5/1926 | Hem | 177/239 |
| 1,973,948 | 9/1934 | Fogelstrom | 248/188.4 |
| 2,805,055 | 9/1957 | Swanson | 177/239 X |
| 3,104,493 | 9/1963 | Nalle | 248/188.4 |
| 4,158,898 | 6/1979 | Denhart | 248/188.4 X |
| 4,274,500 | 6/1981 | Kuhnle | 177/239 X |
| 4,601,356 | 7/1986 | Muccillo, Jr. | 177/211 |
| 4,923,158 | 5/1990 | Saisho | 248/677 X |
| 5,153,052 | 10/1992 | Tanaka et al. | 248/677 X |
| 5,232,064 | 8/1993 | Kroll et al. | 177/211 |
| 5,292,095 | 3/1994 | Cattaneo | 248/188.4 |

FOREIGN PATENT DOCUMENTS

| | | | |
|---|---|---|---|
| 400326 | 10/1933 | United Kingdom | 248/188.4 |
| 487967 | 6/1938 | United Kingdom | 248/188.4 |

*Primary Examiner*—Ramon O. Ramirez
*Attorney, Agent, or Firm*—Melvin J. Scolnick; David E. Pitchenik; Robert H. Whisker

[57] ABSTRACT

An apparatus for adjusting and then maintaining the leveling support of an assembly relative to the surface upon which that assembly has been placed. The apparatus can be locked or maintained in place to prevent the loosening of the adjustment if the assembly is moved. The apparatus is comprised of an elastomeric material molded concentrically around a threaded stud to form a foot; a plurality of longitudinal grooves on the interior wall of the foot; a plurality of longitudinal ridges on the outside surface of an extension from the base section of the assembly; and, a threaded insert within the extension that can mate with the threaded stud.

16 Claims, 2 Drawing Sheets

SCALE LOCKING FOOT

BACKGROUND OF THE INVENTION

This invention relates to an adjustable locking foot assembly which is capable of maintaining a leveling adjustment made to the underside or base of a housing. More particularly, this locking foot assembly is provided for the purpose of maintaining the desired leveling of a postal or shipping scale.

When placing items such as envelopes or packages on top of a postal scale, it is desirable that the weighing platform be level so as not to encourage slippage or movement of the piece to be weighed while it is atop the platform. Leveling is also desirable in order to provide a strictly normal force on the postal scale load cell transducer thereby avoiding errors. Often located at the underside of a scale housing are a plurality of leveling feet for the purpose of leveling the top portion of the housing relative to the surface upon which the scale has been placed.

U.S. Pat. No. 4,219,089 discloses leveling feet which are on threaded shafts and received at the base of the housing. Typically, when adjusting the feet for leveling in these prior art systems, the user must turn over the housing to reduce the weight pressure on the feet in order to turn the feet in the desired direction to adjust the height of the feet. Adjusting of the feet typically becomes a trial and error process which can lead to numerous overturns of the housing until satisfactory leveling is achieved.

U.S. patent application Ser. No. 08/043,693, filed Apr. 8, 1993 and allowed on Feb. 18, 1994 now U.S. Pat. No. 5,332,182, and assigned to the assignee of the present invention, discloses an adjustable level support for a base, comprising a threaded support shaft having a non-circular configuration at one end, a leveling wheel capable of receiving and mating with the threaded support shaft, a retaining structure capable of retaining the rotational movement of the threaded support shaft and capable of restricting movement of the threaded support shaft relative to the base. The distinct advantage over the prior art was the ability to make critical adjustments to the leveling of the scale housing without having to overturn the scale housing, thus protecting the integrity of the circuitry, displays and the other component parts of the scale unit.

The object of the present invention is to provide critical leveling of the scale while providing the advantages of protecting the scale unit integrity by providing a locking foot assembly that permits the user to easily and quickly adjust the desired height of the foot and then lock the adjustment in place.

SUMMARY OF THE INVENTION

According to the invention, the above object is achieved and the disadvantages of the prior art are overcome by an apparatus for providing adjustable level support for a base. The adjustable feet can be locked or maintained in place to prevent the loosening of the adjustment if the base is moved. The apparatus is fashioned of an elastomeric material molded concentrically around a threaded stud to form a foot; a plurality of longitudinal grooves (8 in the preferred embodiment) on the interior wall of the foot; a plurality of longitudinal ridges (4 on the preferred embodiment) on the outside surface of an extension from the base section of the assembly hereinafter referred to as a collar; and, a threaded insert within the extension that can mate with the threaded stud.

DETAILED DESCRIPTION OF THE PREFERRED EMBODIMENT

Figure 1:
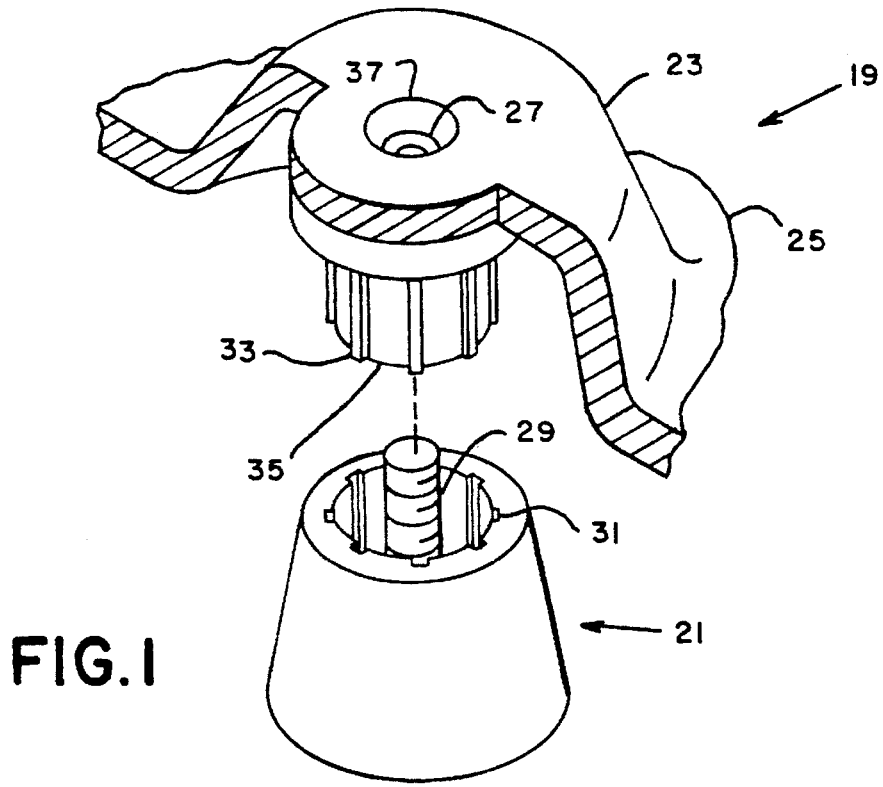
FIG. 1 is a perspective view of the invention with a portion of the base section of the assembly broken away, and with the corresponding locking foot shown in perspective review.

In FIG. 1 herein, a preferred embodiment of the invention is displayed using a cut-out view of a partial section of the base of the housing 25 and the corresponding locking foot 21. A plurality of assemblies 19 are employed to maintain the host unit in a level state.

Assembly 19 is comprised of foot 21 and a portion of the base 23 of housing 25 which supports threaded insert 27. The foot 21 is made from an elastomeric material that is molded around threaded stud 29. There is a plurality of longitudinal grooves 31 in the interior wall of foot 21 extending from the open end to the interior base of foot 21 or to a distance that will allow foot 21 to fully mate with the longitudinal ridges 33 of collar 35.

The height of foot 21 can vary. Those skilled in the art can appreciate, however, that if the present invention is used to support and level a weighing scale base, or the base of any unit requiring a uniform leveling of its upper surface, that each of the plurality of feet can be adjusted so as to maximize the opportunity of obtaining an accurate reading from the scale.

The base section 23 of housing 25 will contain cylindrical sleeve 37 therein to support threaded insert 27. The cylindrical sleeve 37 will begin in the base section 23 of housing 25 and extend beyond the bottom surface of base section 23. The portion of sleeve 37 extending beyond base section 23 will form collar 35 bearing a plurality of longitudinal ridges 33. The longitudinal ridges 33 will be of such a width as to fit into longitudinal grooves 31 of foot 21 when foot 21 and base section 23 are mated by inserting threaded stud 29 of foot 21 into threaded insert 27 of base section 23.

The collar 35 supporting longitudinal ridges 33 is preferably molded as part of base section 23 but could be a separate device attached to base section 23. Collar 35 could be manufactured from any rigid material that will retard or prevent the breaking of longitudinal ridges 33 if pressure from foot 21 or from the housing 25 were applied. The number of longitudinal ridges 33 that collar 35 supports, and the number of grooves 31 that foot 21 contains, will be determined by the extent of axial adjustment required to lock foot 21 after adjustment. In each case, however, the number of longitudinal ridges 33 must be such that it does not exceed the number of grooves 31 of foot 21. If the number of longitudinal ridges 33 exceeds the number of grooves 31, then after having turned foot 21 to thread stud 29 into threaded passage 27, the longitudinal ridge or ridges 33 not engaged by a groove 31 will cause undo pressure to be brought to bear on the longitudinal ridge 33 and not produce a definite detenting action.

As stud 29 of foot 21 is threaded into the thread of insert 27, the elastomeric assembly of foot 21 changes shape to accommodate the continued turning of foot 21 relative to collar 35 as the threading process continues. When the desired extension of foot 21 has been reached, the longitudinal ridges 33 of collar 35 will slip into their corresponding grooves 31 of foot 21. The greater the number of grooves 31, the more exact is the degree of leveling adjustment that is obtained. The elastomeric material of foot 21 will regain its molded shape as longitudinal ridges 33 slip into grooves 31 and will provide enough rigidity to hold the adjustment in place when any pressure or force other than a forceful turning motion is applied against foot 21.

In a preferred embodiment of the invention, the foot 21 has eight grooves 31 on the foot 21 which result in a 0.005 inch adjustment per groove 31 (or detent). The detenting action also helps in leveling the base section 23 by being able to accurately adjust pairs of feet 21 a known amount. For example, it is known in the art of weighing scales to use a visible level bubble to determine whether a leveling adjustment of the scale housing is required. If the visible level bubble of the scale shows the scale is tipped back from a level position, then the two front feet can be rotated for the same number of detents so as to level the scale. This will keep the scale properly leveled; otherwise, without the knowledge of how far one foot 21 of a pair had been adjusted it might be very difficult to adjust the other foot 21 of the pair by the same amount. The grooves 31 (detents) allow the operator of the scale to count the same number of detents for each foot 21 that needs to be adjusted.

Figure 2:
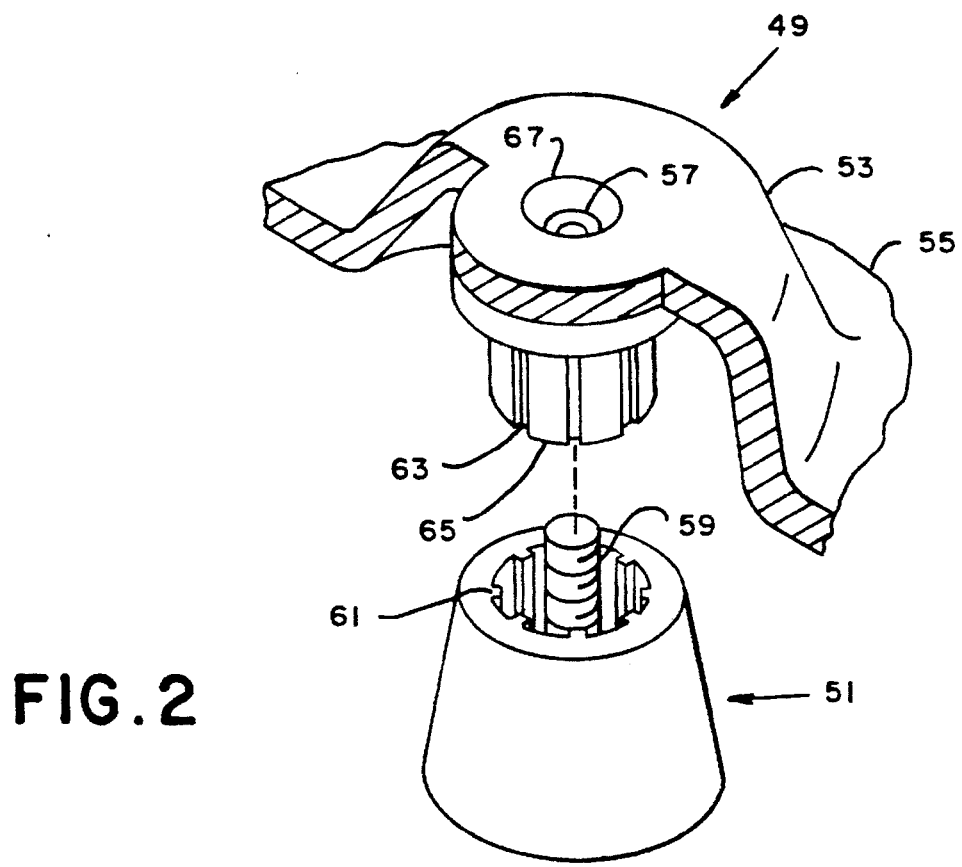
FIG. 2 is a perspective view of an alternative embodiment of the invention showing a locking foot with a threaded stud and longitudinal ridges.

In FIG. 2 herein, an alternative embodiment of the invention is displayed using a broken away view of a portion of the base section of the assembly 55 and the corresponding locking foot 51. A plurality of assemblies 49 are employed to maintain the host unit in a level state.

The assembly 49 of FIG. 2 is comprised of foot 51 which supports threaded stud 59 and a portion of the base 53 of housing 55 which supports threaded insert 57. There is a plurality of longitudinal ridges 61 in the interior wall of foot 51 extending from the open end to the interior base of foot 51 or to a distance that will allow foot 51 to fully mate with the longitudinal grooves 63 of collar 65.

The portion of sleeve 67 extending beyond base section 53 will form collar 65 bearing a plurality of longitudinal grooves 63. The longitudinal grooves 63 will be of such a width as to retain longitudinal ridges 61 of foot 51 when foot 51 and base section 53 are mated by inserting threaded stud 59 of foot 51 into threaded insert 57 of base section 53.

Figure 3:
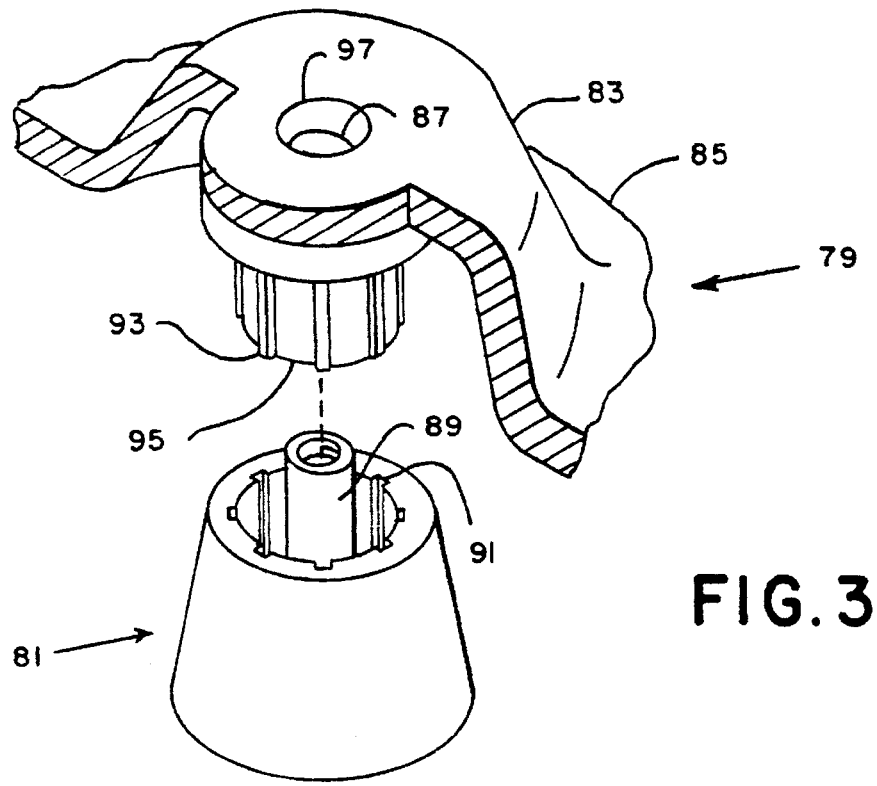
FIG. 3 is a perspective view of an alternative embodiment of the invention showing a locking foot with a threaded insert and longitudinal grooves.

In FIG. 3 herein, an alternative embodiment of the invention is displayed using a broken away view of a portion of the base section of the assembly 85 and the corresponding locking foot 81. A plurality of assemblies 79 are employed to maintain the host unit in a level state.

The assembly 79 of FIG. 3 is comprised of foot 81 which supports threaded insert 89 and a portion of the base 83 of housing 85 which supports threaded stud 87. There is a plurality of longitudinal grooves 91 in the interior wall of foot 81 extending from the open end to the interior base of foot 81 or to a distance that will allow foot 81 to fully mate with the longitudinal ridges 83 of collar 85.

The portion of sleeve 97 extending beyond base section 83 will form collar 95 bearing a plurality of longitudinal ridges 93. The longitudinal ridges 93 will be of such a width as to fit into longitudinal grooves 91 of foot 81 when foot 81 and base section 83 are mated by inserting threaded insert 89 of foot 81 into threaded stud 87 of base section 83.

Figure 4:
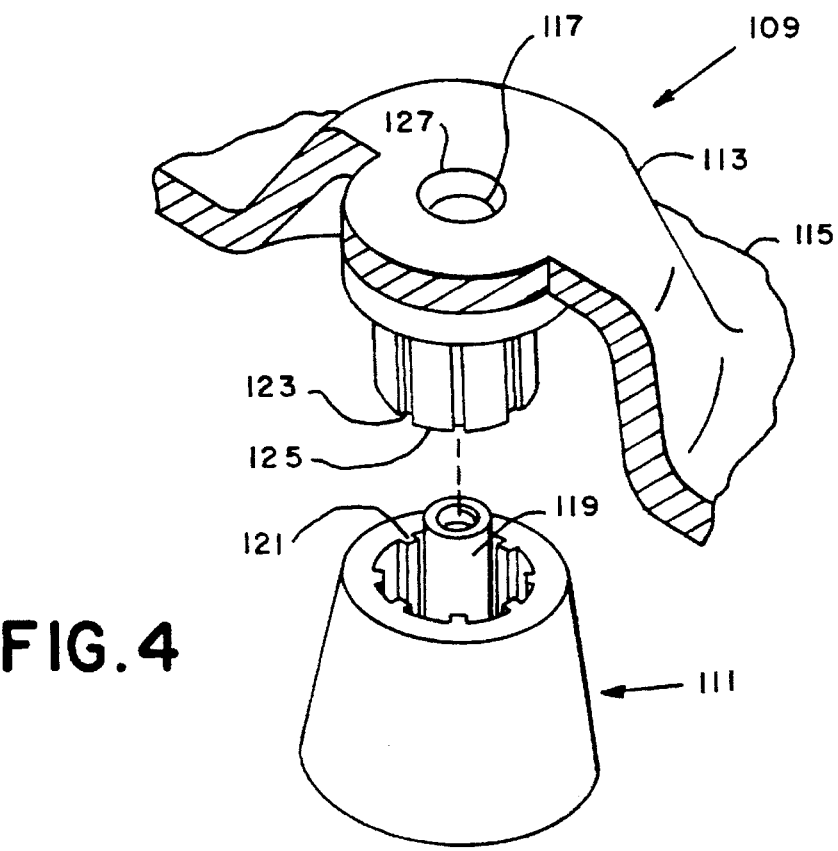
FIG. 4 is a perspective view of an alternative embodiment of the invention showing a locking foot with a threaded insert and longitudinal ridges.

In FIG. 4 herein, an alternative embodiment of the invention is displayed using a broken away view of a portion of the base section of the assembly 115 and the corresponding locking foot 111. A plurality of assemblies 109 are employed to maintain the host unit in a level state.

The assembly of FIG. 4 109 is comprised of foot 111 which supports threaded insert 119 and a portion of the base 113 of housing 115 which supports threaded stud 117. There is a plurality of longitudinal ridges 121 in the interior wall of foot 111 extending from the open end to the interior base of foot 111 or to a distance that will allow foot 111 to fully mate with the longitudinal grooves 113 of collar 115.

The portion of sleeve 127 extending beyond base section 113 will form collar 125 bearing a plurality of longitudinal grooves 123. The longitudinal grooves 123 will be of such a width as to retain longitudinal ridges 121 of foot 111 when foot 111 and base section 113 are mated by inserting threaded insert 119 of foot 111 into threaded stud 117 of base section 113.

As can be appreciated by those skilled in the art, a number of variations of the subject invention are possible. These variations include, but are not limited to: the dimensions of foot 21 and base section 23 as they correspond to each other; the height of foot 21; the width and degree of flair, if any, of foot 21; the width of threaded stud 29 as it corresponds to threaded insert 27; the width and number of longitudinal ridges 33 of base section 23 as they correspond to the width and number of longitudinal grooves 31 of foot 21; and, the nature of base section 23 in that it can be the bottom portion of housing 25 as a whole or a separate distinct device attached to the underside of housing 25.

What is claimed is:

1. A leveling apparatus comprising:
   (a) a foot, said foot being formed of an elastomeric material and further comprising:
      (i) a vertically extending wall and a horizontal portion, said wall and said portion forming a cylinder closed at one end and open at an end opposite said closed end; and
      (ii) a threaded support stud affixed to said horizontal portion and coaxial with said cylinder;
   (b) a cylindrical extension affixed to and extending from a base, for engaging said foot of said apparatus, said cylindrical extension including a threaded support insert for mating with said threaded support stud, whereby when said cylindrical extension engages said foot the vertical separation between said foot and said base can be adjusted by rotating said foot around said base;
   (c) retaining means for affixing said cylindrical extension to said base; and
   (d) locking means for retarding the rotational movement of said foot relative to said base, wherein a portion of said locking means comprises said vertically extending wall of said foot and a portion of said locking means comprises said cylindrical extension.

2. The apparatus of claim 1 wherein said locking means further comprises:
   (a) a plurality of longitudinal grooves in the interior of said vertically extending wall of said foot; and,
   (b) a plurality of longitudinal ridges formed on said cylindrical extension.

3. The apparatus of claim 1 wherein said locking means further comprises:
   (a) a plurality of longitudinal ridges in the interior of said vertically extending wall of said foot extending from the open end of said foot to the interior base of said foot; and
   (b) a plurality of longitudinal grooves formed on said cylindrical extension.

4. The apparatus of claim 2, or of claim 3, wherein said foot is formed from an elastomeric material, said elastomeric material for facilitating movement of said grooves in relation to said ridges.

5. The retaining means of claim 1 wherein said cylindrical extension is a molded extension of said base and said threaded support insert is contained therein.

6. The retaining means of claim 1 comprising said cylindrical extension wherein is provided at least one hole and wherein said at least one hole is mated to a corresponding hole in said base wherein a screw may be passed through said corresponding hole to said at least one hole for the purpose of retaining said cylindrical extension against said base.

7. The retaining means of claim 1 comprising an adhesive to secure said cylindrical extension to said base.

8. An adjustable locking foot comprising:
   (a) a female threaded support shaft;
   (b) a base made of an elastomeric material disposed about said threaded support shaft wherein said base shape may be temporarily altered to allow movement of said adjustable locking foot relative to a supporting apparatus;
   (c) a wall rising from the perimeter of said base, said wall being concentrically displaced about said threaded support shaft so as to form space of equal distance between said wall and said threaded support shaft;
   (d) a plurality of ridges, or a plurality of grooves, equidistant from each other, extending down the interior side of said wall from the top of said wall to a point not further than the interior base of said wall.

9. A leveling apparatus comprising:
   (a) a foot, said foot being formed of an elastomeric material and further comprising:
      (i) a vertically extending wall and a horizontal portion, said wall and said portion forming a cylinder closed at one end and open at an end opposite said closed end; and
      (ii) a threaded support insert affixed to said horizontal portion and coaxial with said cylinder;
   (b) a cylindrical extension, affixed to and extending from a base, for engaging said foot of said apparatus, said cylindrical extension including a threaded support stud for mating with said threaded support insert, whereby when said cylindrical extension engages said foot the vertical separation between said foot and said base can be adjusted by rotating said foot around said base;
   (c) retaining means for affixing said cylindrical extension to said base; and
   (d) locking means for retarding the rotational movement of said foot relative to said base, wherein a portion of said locking means comprises said vertically extending wall of said foot and a portion of said locking means comprises said cylindrical extension.

10. The apparatus of claim 9 wherein said locking means further comprises:
    (a) a plurality of longitudinal ridges in the interior of said vertically extending wall of said foot; and
    (b) a plurality of longitudinal grooves formed on said cylindrical extension containing said threaded support stud, said cylindrical extension extending from said base.

11. The apparatus of claim 9 wherein said locking means further comprises:
    (a) a plurality of longitudinal grooves in said interior wall of said foot; and
    (b) a plurality of longitudinal ridges formed on a cylindrical extension containing said threaded support stud, said cylindrical extension extending from said base.

12. The apparatus of claim 10, or of claim 11, wherein said foot is formed from an elastomeric material, said elastomeric material for facilitating movement of said grooves in relation to said ridges.

13. The retaining means of claim 9 wherein said cylindrical extension is a molded extension of said base and said threaded support stud is contained therein.

14. The retaining means of claim 9 comprising said cylindrical extension wherein is provided at least one hole and wherein said at least one hole is mated to a corresponding hole in said base wherein a screw may be passed through said corresponding hole to said at least one hole for the purpose of retaining said cylindrical extension against said base.

15. The retaining means of claim 9 comprising an adhesive to secure said cylindrical extension to said base.

16. An adjustable locking foot comprising:
    (a) a threaded support stud;
    (b) a base made of an elastomeric material disposed about said threaded support stud wherein said base shape may be temporarily altered to allow movement of said adjustable locking foot relative to a supporting apparatus;
    (c) a wall rising from the perimeter of said base, said wall being concentrically displaced about said threaded support stud so as to form a space of equal distance between said wall and said threaded support stud; and
    (d) a plurality of grooves, or a plurality of ridges, equidistant from each other, extending down the interior side of said wall from the top of said wall to a point not further than the interior base of said wall.

* * * * *